(12) United States Patent
Ibi et al.

(10) Patent No.: US 7,259,726 B2
(45) Date of Patent: Aug. 21, 2007

(54) COMPACT LOOP ANTENNA FOR INDUCTIVE READ/WRITE APPARATUS

(75) Inventors: Toshiaki Ibi, Tokyo (JP); Shigeru Hashimoto, Tokyo (JP); Yoshiyasu Sugimura, Tokyo (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/496,283

(22) Filed: Jul. 31, 2006

(65) Prior Publication Data

US 2007/0030207 A1 Feb. 8, 2007

Related U.S. Application Data

(63) Continuation of application No. PCT/JP2005/000413, filed on Jan. 14, 2005.

(30) Foreign Application Priority Data

Feb. 2, 2004 (JP) ............................. 2004-025358

(51) Int. Cl.
*H01Q 21/00* (2006.01)
(52) U.S. Cl. .................... 343/867; 343/870; 343/742
(58) Field of Classification Search ................ 343/895, 343/867, 742, 700 MS, 870, 866
See application file for complete search history.

(56) References Cited

U.S. PATENT DOCUMENTS 5,808,587 A * 9/1998 Shima .................... 343/895

FOREIGN PATENT DOCUMENTS

| JP | S54-8441 | 1/1979 |
|---|---|---|
| JP | 05-145451 | 6/1993 |
| JP | 11-027030 | 1/1999 |
| JP | 07-263935 | 10/1999 |
| JP | 11-272826 | 10/1999 |
| JP | 2001-325574 | 11/2001 |

OTHER PUBLICATIONS

"International Search Report for Application No. PCT/JP2005/000413, dated Mar. 2005", 2 Pages.

* cited by examiner

*Primary Examiner*—Hoang V. Nguyen
(74) *Attorney, Agent, or Firm*—Schwegman, Lundberg, Woessner and Kluth P.A.

(57) ABSTRACT

In order to provide a compact loop antenna, for use in an inductive read/write apparatus, capable of extending a communication range even if the antenna area or power supply thereto is constrained, a compact loop antenna, for use in an inductive read/write apparatus, comprises two layers of loop antennas, each thereof comprising a printed circuit board 2 for featuring a loop pattern 1, a loop pattern 1 formed by an etching process on the printed circuit board 2, and a start terminal 3 and a end terminal 4 for supplying power for signal transmission and outputting a received signal and each thereof maintaining a predetermined distance from each other.

16 Claims, 5 Drawing Sheets

| LOOP ANTENNA CONFIGURATION | CONTROL BY CHANGEOVER CONTROL UNIT | | COMMUNICATION DISTANCE (A<B<C) |
|---|---|---|---|
| | SW1 | SW2 | |
| ONE LAYER CONFIGURATION | OFF (OPEN) | OFF (OPEN) | A |
| TWO-LAYER CONFIGURATION | ON (CLOSE) | OFF (OPEN) | B |
| THREE-LAYER CONFIGURATION | ON (CLOSE) | ON (CLOSE) | C |

OFF (OPEN) : OPEN (DISCONNECTED) STATE CIRCUIT-WISE
ON (CLOSE) : SHORTING (CONNECTING) STATE CIRCUIT-WISE

F I G. 5

COMPACT LOOP ANTENNA FOR INDUCTIVE READ/WRITE APPARATUS

CROSS REFERENCE TO RELATED APPLICATION

This application is a continuation under 35 U.S.C. 111(a) of PCT/JP2005/000413, filed Jan. 14, 2005 and published as WO 2005/074072 A1, filed Aug. 11, 2005, which claimed priority under 35 U.S.C. 119 to Japanese Application No. 2004-025358, filed Feb. 2, 2004, which applications and publication are incorporated herein by reference and made a part hereof.

BACKGROUND OF THE INVENTION

1. Field of the Invention

The present invention relates to a compact loop antenna.

2. Description of the Related Art

Loop antennas have conventionally been used as basic antenna. A loop antenna is simply structured, easily made compact and deployed at low cost, thus being used for conventional inductive read/write apparatus.

In recent years, the inductive read/write apparatuses (e.g., noncontact type cards) have been put into use, such as noncontact type cards conforming to ISO standards, i.e., ISO14443, ISO15693, et cetera. Among them, communication systems conforming to ISO14443 are adopted as the noncontact type cards performing at a communication range up to 10 cm in many cases. Meanwhile, the ISO15693 standard provides for a communication range up to approximately 70 cm and therefore many apparatus utilize it as an RF-ID (Radio Frequency Identification). When mounting a loop antenna onto an inductive read/write apparatus, the general practice is to form the loop antenna by using a printed circuit board for applying an etching of a spiral pattern with a plurality of turns of the spiral.

Figure 1A:
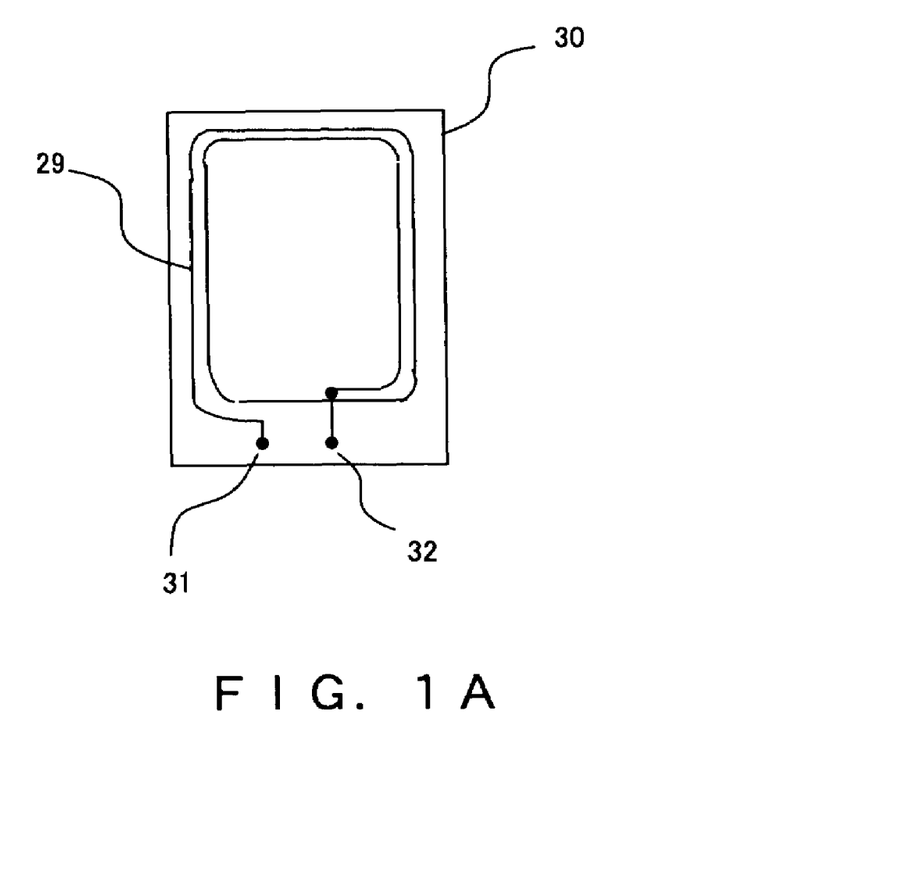
FIG. 1A shows a top view of an example of a conventional loop antenna.
Figure 1B:
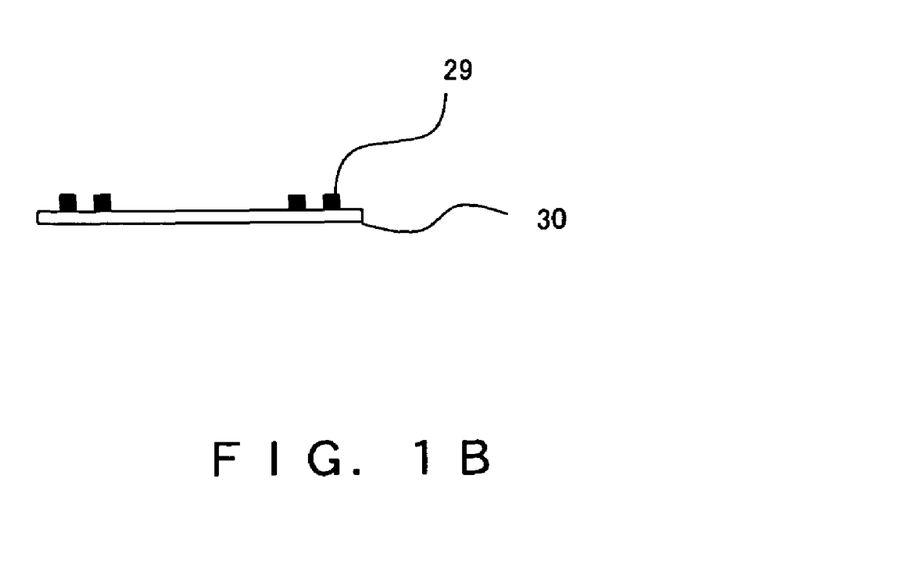
FIG. 1B shows a cross-sectional view of an example of a conventional loop antenna.

For example, FIGS. 1A and 1B show an example of a conventional configuration of a loop antenna.

FIG. 1A shows a top view of the loop antenna including a printed circuit board 30 on which a loop pattern 29 is formed, a loop pattern 29 formed by an etching process, et cetera, on the printed circuit board 30, a start point terminal 31 and an end point terminal 32 for supplying power for transmitting a signal and outputting a received signal.

Incidentally, the example configuration shown by FIG. 1A shows the loop pattern 29 in the case of forming a loop with two turns of the spiral.

FIG. 1B shows a cross section of the loop antenna shown by FIG. 1A. As shown by FIG. 1B, a conventional loop antenna is formed by a plurality of loops of different sizes in order to form a spiral loop pattern on one board.

A patent document, laid-open Japanese patent application publication No. 54-008441, has disclosed a loop antenna in a combination of a plurality of loop antenna elements, with different loop radii around the same center, which are placed on the same plane. And a patent document, laid-open Japanese patent application publication No. 11-272826, has disclosed a loop antenna, applying to an IC card, et cetera, which is configured so that the conjunction of a plurality of spirals is non-dense in order to improve the efficiency of an antenna and increase a communicable distance in a comprisal for receiving power supply by the antenna.

In a spiral loop antenna formed by a plurality of spirals such as the loop antenna shown by FIGS. 1A and 1B, an antenna area (i.e., an area through which flux linkage passes within a loop formed by a loop pattern of the loop antenna) and the power which can be supplied to the antenna are actually limited by design constraints such as the size of a transmitter or receiver on which the loop antenna is mounted, or a battery capacity. The allowed antenna area and supplied power, et cetera, make it difficult to increase a field intensity in the direction perpendicular to the antenna face, hence it is very hard to increase a read/write distance (i.e., communication range).

Here, it is conceivable to etch a loop pattern by increasing the number of spiral turns further to four or five on a single board in the antenna shown by FIGS. 1A and 1B, but the field intensity increases only in the direction horizontal to the antenna face and not in the perpendicular direction (NB the field follows the right-hand screw rule and is generated in the direction of the right rotation with respect to the direction of current flowing in the pattern. If there is a plurality of patterns which are lined up in the horizontal direction and therefore the field does not increase in the perpendicular direction). Although there is a method of increasing transmission power to strengthen a radio wave, the size of power supply unit becomes large, generating more heat and increasing cost. Such is the problem.

For all this, increasingly in demand recently is a technique to extend a communication range with a small antenna area and low power.

SUMMARY OF THE INVENTION

Having considered the problem as described above, the challenge of the present invention is to provide a compact loop antenna capable of extending a communication range even though an antenna area or a power supply to the antenna is limited, for use in an inductive read/write apparatus.

An embodiment of the invention herein is a loop antenna, for use in an inductive read/write apparatus, which is characterized as layering two or more loop patterns, by maintaining a predetermined distance from one another, each of which being formed by at least one turn of a spiral, interconnecting respective start points of all the layered loop patterns and interconnecting respective end points thereof, thereby connecting all the layered loop patterns in parallel.

According to an embodiment of the invention, interconnecting respective start points of the layered loop patterns and interconnecting respective end points thereof, thereby connecting all the layered loop patterns in parallel, and therefore causing the currents in all the patterns to flow in the same direction to generate respective magnetic fields in the same direction for all the loop patterns, results in overlapping magnetic fields, increasing a magnetic field strength and hence accomplishing the effect of an extended communication range.

And the layered loop pattern is configured to be connected in parallel with a transmission unit which transmits a signal by way of the loop antenna and therefore accomplishing the benefit of minimally increasing power supplied from the transmission unit to the loop antenna.

An embodiment of the invention includes the loop antenna, for use in an inductive read/write apparatus, which is characterized as placing two or more boards, each of which is formed with one loop pattern on a single board, in layers with the said boards being maintained at a predetermined distance from one another. Accordingly the same effect as the invention noted herein is acquired. That is, by interconnecting respective start points of the layered loop patterns and interconnecting respective end points thereof, thereby connecting all the layered loop patterns in parallel, and therefore causing the currents in all the patterns flow in the same direction to generate respective magnetic fields in the same direction for all the loop patterns, results in overlapping magnetic fields, increasing a magnetic field intensity and hence accomplishing the effect of an extended communication range.

And the loop pattern formed on the layered board is configured to be connected in parallel with a transmission unit which transmits a signal by way of the loop antenna and therefore accomplishes the benefit of minimally increasing power supplied from the transmission unit to the loop antenna.

An embodiment of the invention includes the loop antenna, for use in an inductive read/write apparatus, which is characterized as placing the loop pattern in layers on a single board by maintaining a predetermined distance from one another. Accordingly, the same effect as the invention noted herein is acquired. That is, by interconnecting respective start points of the layered loop patterns and interconnecting respective end points thereof, thereby connecting all the layered loop patterns in parallel, and therefore causing the currents in all the patterns to flow in the same direction to generate respective magnetic fields in the same direction for all the loop patterns, results in overlapping magnetic fields, increasing a magnetic field strength and hence accomplishing the effect of an extended communication range.

And the loop pattern formed on the layered board is configured to be connected in parallel with a transmission unit which transmits a signal by way of the loop antenna and therefore accomplishes the benefit of minimally increasing power supplied from the transmission unit to the loop antenna.

An embodiment of the invention noted includes the loop antenna, for use in an inductive read/write apparatus, according to other embodiments, which is characterized as further comprising an inter-start point connection changeover unit for connecting between the respective start points of the layered loop pattern selectively, and an inter-end points connection changeover unit for connecting between the respective end points of the layered loop pattern selectively. Accordingly, the comprisal of the inter-start point connection changeover unit for connecting between the respective start points of the layered loop pattern selectively and inter-end points connection changeover unit for connecting between the respective end points of the layered loop pattern selectively accomplishes the benefit of enabling adjustment of the number of loop patterns connected in parallel with the transmission unit for transmitting a signal by way of the loop antenna, in addition to the same effect as other embodiments of the invention.

An embodiment of the invention includes the loop antenna, for use in an inductive read/write apparatus, which is characterized as the inter-start point connection changeover unit and the inter-end point connection changeover unit switching according to a communication range. Accordingly, it is possible to set the antenna for a short communication range by the inter-start point connection changeover unit and inter-end point connection changeover unit reducing the number of loop patterns connected in parallel with the transmission unit, while setting the antenna for a long communication range by the inter-start points connection changeover unit and inter-end points connection changeover unit increasing the number of loop patterns connected in parallel with the transmission unit, in addition to the same effect as other embodiments of the invention.

DESCRIPTION OF THE PREFERRED EMBODIMENT

The following is a description of the preferred embodiment of the present invention while referring to FIGS. 2A through 5.

Figure 2A:
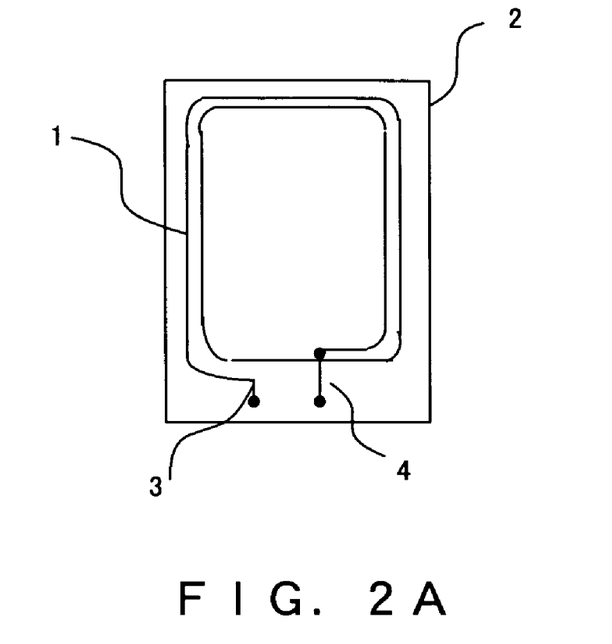
FIG. 2A shows a top view of comprisal of a loop antenna according to a first embodiment of the present invention.
Figure 2B:
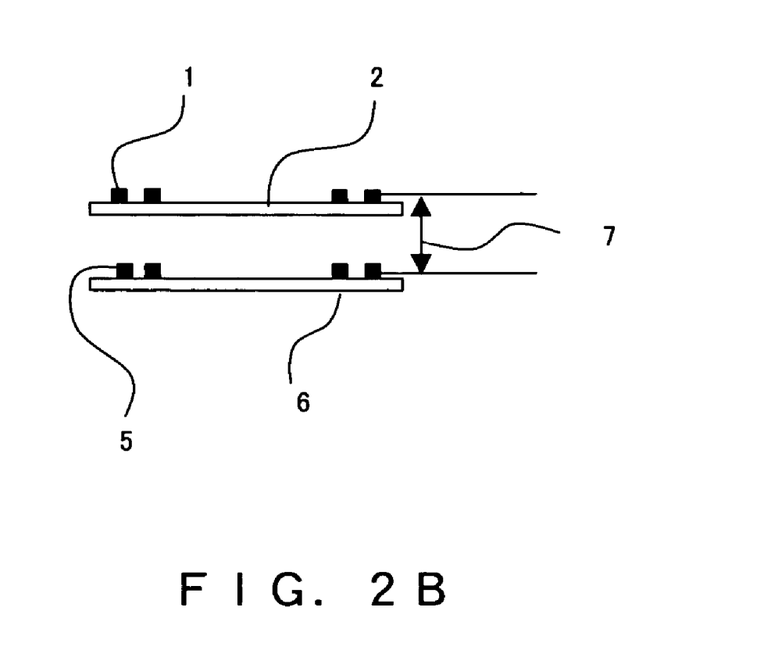
FIG. 2B shows a cross-sectional view of comprisal of a loop antenna according to the first embodiment of the present invention.

FIGS. 2A and 2B show a comprisal of a loop antenna according to a first embodiment of the present invention.

FIG. 2A shows a top view of comprisal of a loop antenna according to a first embodiment of the present invention.

A compact loop antenna according to the present embodiment, for use in an inductive read/write apparatus, is the one layering a first layer loop antenna including a first printed circuit board 2 on which a first loop pattern 1 is featured, the first loop pattern 1 featured on the first printed circuit board 2 by an etching process, et cetera, and a start terminal 3 and a end terminal 4 for supplying power for signal transmission and outputting a received signal; and a second layer loop antenna (not shown in FIG. 2A) including a second printed circuit board 6 on which a second loop pattern 5 is featured, the second loop pattern 5 featured on the second printed circuit board 6 by an etching process, et cetera, and a start terminal and a end terminal for supplying power for signal transmission and outputting a received signal by holding them at a predetermined distance from each other.

FIG. 2B shows a cross-sectional view of a comprisal of a loop antenna according to the first embodiment of the present invention.

The start terminal 3 of the loop pattern 1 featured on the first printed circuit board 2 and the start terminal (not shown here) of the loop pattern 5 featured on the second printed circuit board 6 are interconnected, and likewise the end terminal 4 of the loop pattern 1 featured on the first printed circuit board 2 and the end terminal (not shown here) of the loop pattern 5 featured on the second printed circuit board 6 are also interconnected and power is supplied so that the direction of the current flowing in the first loop pattern 1 is the same as that of the current flowing in the second loop pattern 5.

By this configuration, the first loop pattern 1 and second loop pattern 5 are connected in parallel with a power supply unit (not shown here) for supplying the loop antenna, the unit being connected with the above described start and end terminals, with power, thereby making it possible to suppress an increase of the supplied power.

And the first printed circuit board 2 featured by the loop pattern 1 having two turns of spirals formed by an etching process, et cetera, is layered with the second printed circuit board 6 by retaining a predetermined distance 7 which is established by adjustment so as to gain the maximum magnetic field strength of the entire antenna (i.e., a magnetic field strength in the direction perpendicular to the antenna face). According to the present embodiment, the predetermined distance 7 is approximately 2 mm with respect to the area of an antenna structured as a square of approximately 10 cm (long) by approximately 10 cm (wide).

Although it appears at a glance that the magnetic field strength of the entire antenna becomes the maximum when setting the distance 7 between the first printed circuit board 2 and second printed circuit board 6 at zero (0), the actual distance where the magnetic field strength becomes the maximum is considered to be variable as a result of influences such as self-inductance inherent to the first loop pattern 1 featured on the first printed circuit board 2, self-inductance inherent to the second loop pattern 5 featured on the second printed circuit board 6 and mutual inductance between the first loop pattern 1 and second loop pattern 5.

For instance, when a flux Φ generated by a current I flowing in the first loop pattern 1 passes through the second loop pattern 5, the current I flowing therein is decreased by the generation of back electromotive force in the second loop pattern 5 due to mutual inductance between the first loop pattern 1 possessed by the second loop pattern 5 and the second loop pattern 5. Because of this, the magnetic field strength generated in the second loop pattern 5 decreases as a result of the current I flowing therein. Moreover, the flux linkage passing through the loop formed by the second loop pattern 5 increases inversely proportionally with the distance between the first loop pattern 1 and the second loop pattern 5. Therefore, the magnetic field strength of the entire antenna cannot conceivably be maximized simply by setting the distance 7 between the first printed circuit board 2 and the second printed circuit board 6 to zero (0).

Layering loop antennas in multiple layers as in the configuration shown by FIGS. 2A and 2B can extend the communication range even if there is a limitation in the antenna area, hence providing a benefit of extended distance for reading and writing for an inductive read/write apparatus.

While the present embodiment describes a compact loop antenna, for use in an inductive read/write apparatus, in the case of layering two layers of loop antennas as shown by FIGS. 2A and 2B, the present invention is not limited to layering two layers of loop antennas. That is, it may be configured to have two or more layers of loop antennas rather than the two layers shown by the present embodiment, by which a communication range can be further extended.

And, the first loop pattern 1 and second loop pattern 5 shown by FIGS. 2A and 2B are for the case of two turns, but the present invention is not limited as such. A plurality of turns of loops, i.e., one turn or more, may be applied.

Meanwhile, the board herein uses an inflexible rigid printed circuit board, but it may use a film board formed by applying a copper circuit pattern onto a flexible base film (e.g., PET (Polyethylene Terephthalate) film).

Figure 3:
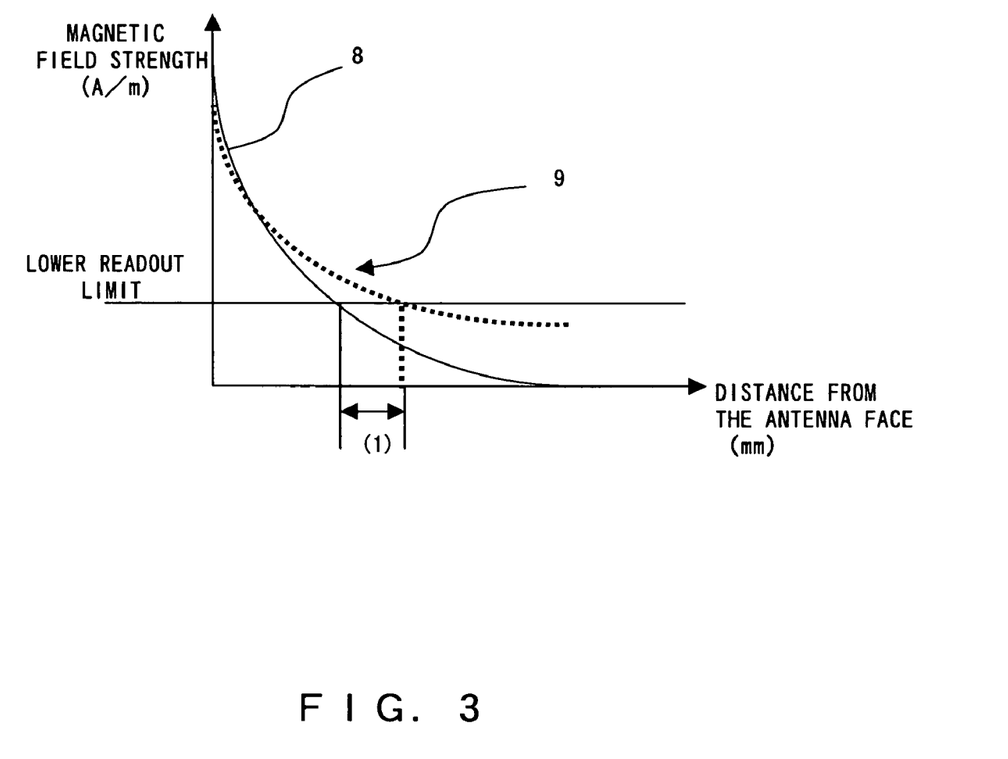
FIG. 3 shows magnetic field strength of a loop antenna according to the first embodiment of the present invention.

FIG. 3 shows the magnetic field strength of a loop antenna according to the first embodiment of the present invention.

FIG. 3 shows the magnetic field strength as a function of the distance from the antenna face, indicating a characteristic curve with the horizontal axis representing the distance (unit: mm) from the antenna face and the vertical axis representing the magnetic field strength (unit: A/m).

Referring to FIG. 3, the solid line 8 indicates the characteristic of the conventional loop antenna exemplified by FIGS. 1A and 1B, while the dotted line 9 indicates that of the antenna according to the present embodiment. And the solid line drawn in parallel with the horizontal line indicating the distance (mm) from the antenna face indicates the minimum value (i.e., the lower reading limit) magnetic field strength allowing reading of signal through a communication. If the field strength is lower than the lower reading limit, a signal reading through communication becomes impossible due to field power shortage, and therefore signal reading is enabled within a distance from the antenna face in the range (i.e., above the line of the lower reading limit) where the magnetic field strength is larger than the lower reading limit.

It is understood that the use of the antenna according to the present embodiment extends the communication range by the distance (1) shown by FIG. 3.

Figure 4:
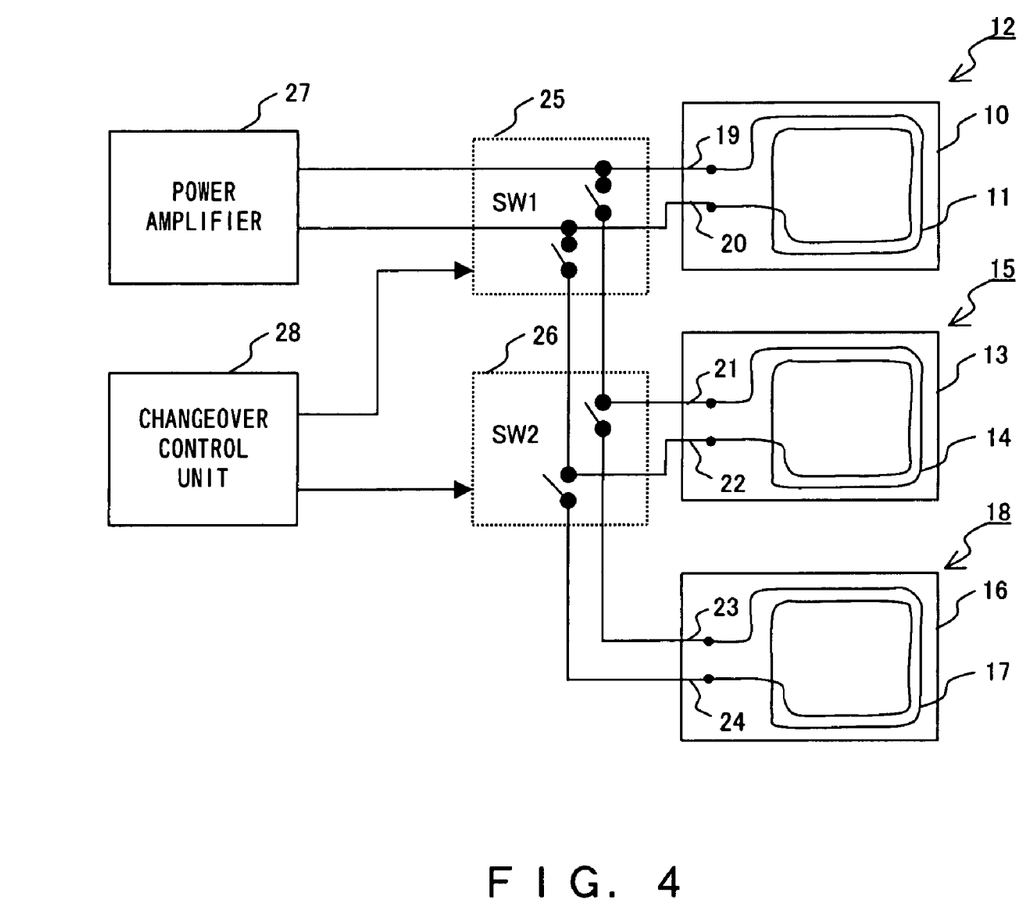
FIG. 4 shows a comprisal of a loop antenna according to the second embodiment of the present invention.

FIG. 4 shows a comprisal of a loop antenna according to the second embodiment of the present invention.

A compact loop antenna, for use in an inductive read/write apparatus according to the present embodiment, includes at least a first layer loop antenna 12 constituted by a first printed circuit board 10 and a loop pattern 11 which is formed by an etching process, et cetera, thereon; a second layer loop antenna 15 constituted by a second printed circuit board 13 featured by a loop pattern and a loop pattern 14 formed by an etching process, et cetera, thereon; a third layer loop antenna 18 constituted by a third printed circuit board 16 and a loop pattern 17 formed by an etching process, et cetera, thereon; a first changeover switch 25 connected to the start terminal 19 and end terminal 20 of the first layer loop antenna 12, to the start terminal 21 and end terminal 22 of the second layer loop antenna 15 and to the start terminal 23 and end terminal 24 of the third layer loop antenna 18; and a second changeover switch 26 connected to the start terminal 21 and end terminal 22 of the second layer loop antenna 15 and to the start terminal 23 and end terminal 24 of the third layer loop antenna 18.

The first layer loop antenna 12, second layer loop antenna 15 and third layer loop antenna 18 are layered by maintaining a predetermined interval between layers, with the interval being adjusted so as to maximize a magnetic field strength of the entire antenna (i.e., the magnetic field strength in the direction perpendicular to the antenna face).

A changeover control unit 28, equipped in a transmission or receiving unit which is not delineated in the drawing showing the present embodiment, controls each changeover switch by being connecting to each changeover switch in order to control the first changeover switch 25 and second changeover switch 26.

Here, in the present embodiment, the changeover control unit 28 has the function of instructing each changeover switch to change over according to a communication range and comprises a CPU (central processing unit) equipped within transmission or receiving units, a nonvolatile memory (e.g., EEPROM) for storing data, such as a program for making the CPU carry out changeover control, a register or nonvolatile memory (e.g., RAM) used for operation of the CPU, which maybe constituted by a logic circuit such as a transistor.

And the first changeover switch 25 and a second changeover switch 26 are constituted by a transistor, et cetera, and the states of the respective changeover switches are switched On or Off according to control signals from the changeover control unit 28.

And the start and end points of the respective layer loop antennas are connected to a power amplifier 27, which is equipped within transmission or receiving units, neither of which is shown in the drawing, for supplying the antennas with power, by way of the first changeover switch 25 and second changeover switch 26.

When the first changeover switch 25 is in the Off state (accordingly the second changeover switch 26 is also in the Off state), a loop antenna according to the present embodiment becomes an antenna constituted by the first layer loop antenna 12 only(i.e., the second layer loop antenna 15 and third layer loop antenna 18 are isolated from the transmission and receiving units circuit-wise).

When the first changeover switch 25 is in the On state and the second changeover switch 26 is in the Off state, the antenna becomes the one constituted by layering the first layer loop antenna 12 and second layer loop antenna 15, with the distance between the two being maintained at a predetermined interval (i.e., the third layer loop antenna 18 is isolated from the transmission and receiving units circuit-wise).

Furthermore, when the first changeover switch 25 and second changeover switch 26 are both in the On state simultaneously, the antenna becomes the one constituted by layering the first layer loop antenna 12, second layer loop antenna 15 and third layer loop antenna 18 with the distance from one another being maintained at a predetermined interval.

Figure 5:
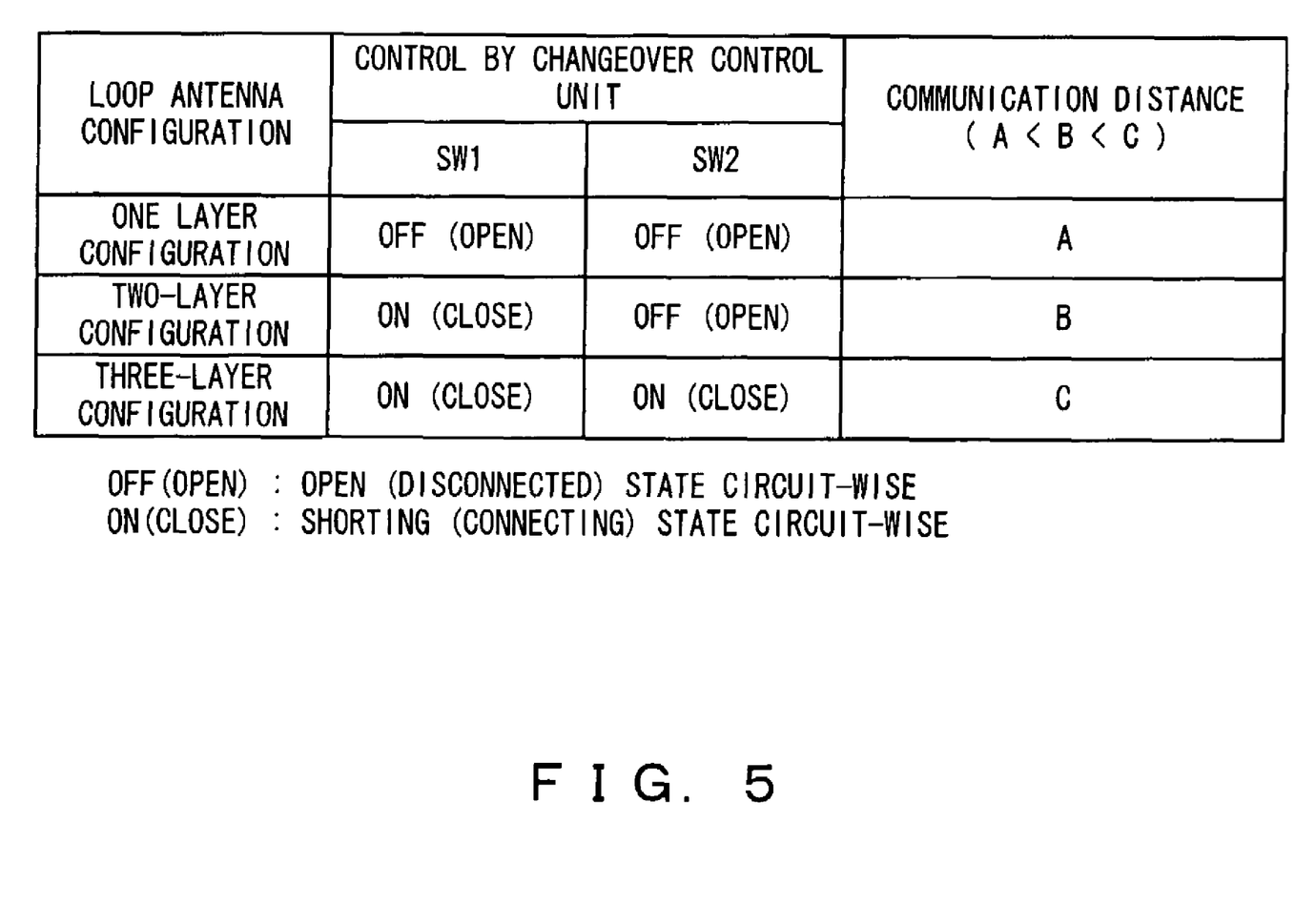
FIG. 5 exemplifies a loop antenna switching system according to the second embodiment of the present invention.

FIG. 5 exemplifies a loop antenna switching system according to the second embodiment of the present invention.

FIG. 5 exemplifies a table for changing over the structure of a loop antenna among one to three layers as a result of the changeover control unit 28 shown by FIG. 4 controlling the first changeover switch 25 and second changeover switch 26 in the case of communication ranges A, B and C having the relationship of A<B<C. And the table shown by FIG. 5 is pre-stored by a ROM comprised by the changeover control unit 28 for example and the control is carried out by the CPU referring to entries thereof one after another.

As a sensor (not shown herein) notifies the CPU of the communication range being "C", the CPU refers to an address stored by the above described table, sends a control signal to the first changeover switch 25 instructing it to assume the On state and also sends a control signal to the second changeover switch 26 instructing it to assume the On state. The first changeover switch 25 and second changeover switch 26 assume the On state according to the control signal from the changeover control unit 28 so as to constitute a three-layer antenna by layering the first layer loop antenna 12, second layer loop antenna 15 and third layer loop antenna 18, thereby acquiring the largest communication range among the configurations according to the present embodiment.

Likewise, as a sensor (not shown herein) notifies the CPU of the communication range being "B", the CPU refers to an address stored by the above described table, sends a control signal to the first changeover switch 25 instructing it to assume the On state and also sends a control signal to the second changeover switch 26 instructing it to assume the Off state. The first changeover switch 25 assumes the On state, while the second changeover switch 26 assumes the Off state, according to the control signal from the changeover control unit 28 so as to constitute a two-layer antenna by layering the first layer loop antenna 12 and second layer loop antenna 15.

Furthermore, as a sensor (not shown herein) notifies the CPU of the communication range being "A", the CPU refers to an address stored by the above described table, and sends a control signal to the first changeover switch 25 and second changeover switch 26 instructing each to assume the Off state. The first changeover switch 25 and second changeover switch 26 assume the Off state according to the control signal from the changeover control unit 28 so as to constitute an antenna consisting of only the first layer loop antenna 12, thereby acquiring the smallest communication range among the configurations according to the present embodiment.

As described above, the capability of changing a communication range on as required basis makes it possible to suppress power consumption even further. It is also readily possible to prevent radio waves from being emitting too far, influencing other equipment.

Note that the first changeover switch 25 and second changeover switch 26 being in the On state mean that they are connected circuit-wise, while the Off state means that they are disconnected circuit-wise, in the above descriptions.

The above description has dealt with the case of the changeover control unit 28 changing over the layering states of an antenna automatically according to a communication range, but it is not limited to changing over the layering states of the antenna automatically. For instance, a manual changeover may be possible by configuring the first changeover switch 25 and second changeover switch 26 by using a dip switch, et cetera.

Moreover, the initial state at a communication start may be configured as a three-layer loop antenna and the first changeover switch 25 and second changeover switch 26 may be controlled to change over structures according to a communication condition or communication range in order to change over the structures of the loop antenna between one through three layers.

The loop antennas according to the first and second embodiments of the present invention exemplify the case of featuring one loop pattern on each board and configuring an antenna by layering the boards, but the present invention is not limited as such. For instance, a loop antenna may be configured by layering two or more loop patterns on a single board by maintaining a predetermined interval. In such a case, each loop pattern is layered by way of an insulator layer being inter-positioned in-between, for instance, whose thickness is adjusted so as to maximize the magnetic field strength of the entire antenna (i.e., the magnetic field strength in the direction perpendicular to the antenna face).

Alternatively, a loop antenna may be configured by forming a loop pattern on the top and bottom surfaces of a single board. In such a case, the thickness of the board may be adjusted so as to maximize the magnetic field strength of the entire antenna (i.e., the magnetic field strength in the direction perpendicular to the antenna face).

It is desired that the form and size of a loop pattern (e.g., the size of the entire loop, the thickness and width of the conductor pattern constituting the loop, et cetera) constituting the loop antennas according to the first and second embodiments of the present invention are the same, but the present invention is not limited as such. If the form and size are somewhat different, it is in the scope of the present invention, and even if the area of antenna and the supply power thereto are constrained, the benefit of extended communication range can be acquired.

As described above, every aspect of the present invention makes it possible to provide a compact antenna, for use in an inductive read/write apparatus, capable of extending a communication range even if the antenna area or power supply thereto is constrained.

All documents, patents, and other references listed above are hereby incorporated by reference for any purpose.

What is claimed is:

1. A loop antenna, for use in an inductive read/write apparatus, comprising:
two or more loop patterns, by maintaining a predetermined distance from one to another, each of which being formed by at least one turn of spiral, interconnecting respective start points of all the layered loop patterns and interconnecting respective end points thereof, thereby connecting all the layered loop patterns in parallel,
an inter-start point connection changeover unit for connecting between respective start points of said layered loop pattern selectively, and
an inter-end point connection changeover unit for connecting between respective end points of said layered loop pattern selectively.

2. The loop antenna, for use in an inductive read/write apparatus, according to claim 1, wherein:
placing two or more boards, each of which is formed with one said loop pattern, in layers being maintained in a predetermined distance from one another.

3. The loop antenna, for use in an inductive read/write apparatus, according to claim 2, wherein said inter-start point connection changeover unit and said inter-end point connection changeover unit respectively change over connections according to a communication range.

4. The loop antenna, for use in an inductive read/write apparatus, according to claim 1, wherein:
placing said loop patterns in layers on a single board with the aforementioned loop patterns being maintained in a predetermined distance from one another.

5. The loop antenna, for use in an inductive read/write apparatus, according to claim 4, wherein said inter-start point connection changeover unit and said inter-end point connection changeover unit respectively change over connections according to a communication range.

6. The loop antenna, for use in an inductive read/write apparatus, according to claim 1, wherein:
said inter-start point connection changeover unit and said inter-end point connection changeover unit respectively change over connections according to a communication range.

7. A loop antenna, for use in an inductive read/write apparatus, comprising:
two or more loop patterns at a distance from one to another, each loop pattern including a start, an end, and at least one spiral turn;
an inter-start point connection changeover unit to connect respective starts of the loop patterns selectively, and
an inter-end point connection changeover unit to connect between respective ends of the loop pattern selectively.

8. The loop antenna according to claim 7, wherein the respective starts of all the loop patterns are interconnected.

9. The loop antenna according to claim 8, wherein the respective ends are interconnected such that all the loop patterns are in parallel.

10. The loop antenna according to claim 7, wherein the respective ends are interconnected.

11. The loop antenna according to claim 7, wherein the loop patterns are in parallel.

12. The loop antenna according to claim 11, wherein each loop pattern is positioned in a board.

13. The loop antenna according to claim 11, wherein the boards are positioned at a set distance from one another.

14. The loop antenna according to claim 11, wherein the loop patterns are positioned in layers on a single board.

15. A loop antenna, for use in an inductive read/write apparatus, comprising:
two or more loop patterns at a distance from one to another, each loop pattern including a start, an end, and at least one spiral turn, wherein the respective starts of all the loop patterns are interconnected and wherein the respective ends are interconnected such that all the loop patterns are in parallel;
an inter-start point connection changeover unit to connect respective starts of the loop patterns selectively; and
an inter-end point connection changeover unit to connect between respective ends of the loop pattern selectively.

16. The loop antenna according to claim 15, wherein the loop patterns are positioned in layers on a single board.

* * * * *